United States Patent
Reed et al.

(10) Patent No.: US 8,688,733 B2
(45) Date of Patent: Apr. 1, 2014

(54) REMOTE INVENTORY MANAGER

(75) Inventors: David Charles Reed, Tucson, AZ (US); Max Douglas Smith, Tucson, AZ (US); Joseph Vincent Malinowski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/422,629

(22) Filed: Mar. 16, 2012

(65) Prior Publication Data
US 2013/0246467 A1    Sep. 19, 2013

(51) Int. Cl.
*G06F 17/30* (2006.01)

(52) U.S. Cl.
CPC ................................ *G06F 17/30109* (2013.01)
USPC ............................. 707/781; 707/783; 707/785

(58) Field of Classification Search
CPC ...................... G06F 21/6218; G06F 17/30109; G06F 21/6227
USPC .................................... 707/781, 999.009, 687
See application file for complete search history.

(56) References Cited

U.S. PATENT DOCUMENTS

| | | | |
|---|---|---|---|
| 6,308,179 B1 * | 10/2001 | Petersen et al. | 1/1 |
| 6,816,957 B1 | 11/2004 | Halladay | |
| 7,254,837 B2 | 8/2007 | Fields | |
| 7,346,565 B2 | 3/2008 | Byrne et al. | |
| 7,561,530 B2 | 7/2009 | Fu et al. | |
| 7,676,627 B2 | 3/2010 | Wong et al. | |
| 7,685,425 B1 * | 3/2010 | Wright et al. | 713/176 |
| 7,761,471 B1 * | 7/2010 | Lee et al. | 707/783 |
| 8,166,003 B2 * | 4/2012 | Friesenhahn et al. | 707/695 |
| 2004/0034788 A1 * | 2/2004 | Ross | 713/193 |
| 2004/0225719 A1 * | 11/2004 | Kisley et al. | 709/212 |
| 2005/0097441 A1 * | 5/2005 | Herbach et al. | 715/501.1 |
| 2006/0074913 A1 * | 4/2006 | O'Sullivan et al. | 707/9 |
| 2006/0179321 A1 * | 8/2006 | Dawson et al. | 713/182 |
| 2006/0277301 A1 * | 12/2006 | Takanashi et al. | 709/225 |
| 2007/0038673 A1 | 2/2007 | Broussard | |
| 2007/0061456 A1 * | 3/2007 | Waris | 709/225 |
| 2007/0067468 A1 | 3/2007 | Hyodo | |
| 2008/0189242 A1 | 8/2008 | Meier | |
| 2009/0077377 A1 * | 3/2009 | Cobelo et al. | 713/165 |
| 2011/0107047 A1 * | 5/2011 | Sela et al. | 711/163 |
| 2011/0258438 A1 | 10/2011 | Hildebrand | |
| 2012/0284642 A1 * | 11/2012 | Sitrick et al. | 715/753 |

* cited by examiner

*Primary Examiner* — Miranda Le

(74) *Attorney, Agent, or Firm* — Terrile, Cannatti, Chambers & Holland, LLP; Stephen A. Terrile

(57) ABSTRACT

A documentation inventory manager which assigns a protection key to each piece of documentation that is received. More specifically, when providing information to a receiving company, a client provides their files to a common FTP server. As a support team of the receiving company accesses the files and stores some or all of the files to a local storage system, the files are modified to include an imbedded header record. In certain embodiments, the imbedded header record includes information regarding an original file name sent by the client, a key value that is assigned to that version of the downloaded file, permissions such as whether the file can be copied, and the inventory manager location. Each time a version of the file is downloaded to a different location within the receiving company, that file name, location, and new unique key is updated in the documentation inventory manager.

3 Claims, 3 Drawing Sheets

HEADER_RECORD
- Original file name sent by the client
- A unique File key that corresponds to the file key in the CUST_DOC_TABLE.
- Permissions flag to indicate that this dataset cannot be copied
- Location of file

FIGURE 3

- Unique File Key: a unique key generated automatically
- PMR Number this helps associate doc with a certain PMR
- Server filename: text
- Customer ID: this corresponds to a customer's RETAIN client ID
- Customer E-mail: text
- Download_status: values ('enabled','disabled')
Table to Hold an Entry for every time the file is downloaded by the receiving company (COMP_DOC_TABLE)
- Unique File Key: this relates the entry to the CUST_DOC_TABLE Unique File Key
- Company system name: This is the system to which the document was downloaded
- Company file name. This is the filename of the document on the company system

FIGURE 4

REMOTE INVENTORY MANAGER

BACKGROUND OF THE INVENTION

1. Field of the Invention

The present invention relates in general to the field of computer operations and, more particularly to a remote inventory manager for use with computer operations.

2. Description of the Related Art

Often in the area of information technology (IT) support, clients send data to another company for that data to be analyzed or temporarily accessed. When the need for that data has ended, the client who initially provided the data has no reliable way to confirm whether their data has been deleted and no reliable control over when that data is deleted. For example, when a company requests documentation from a client to diagnose a problem, the client may provide items like memory storage dumps. These storage dumps often contain proprietary or confidential information. Clients often hesitate to provide this information, because the client cannot be assured that the information will be handled and disposed of properly. Accordingly, it is desirable to provide an ability to allow an audit of the information to ensure that a client's data is handled and disposed of properly.

For example, in known systems, when clients provide documentation, the information is provided to a common server. Different individuals or groups of the receiving company can access the data from that server. For example if one group is working on a client's issue, and another group is working on that same issue, both groups access that data and store it at different locations within the receiving company. An external client does not necessarily have access to where their data has been stored and have no easy way to know or control whether or when their data has been deleted.

SUMMARY OF THE INVENTION

In accordance with the present invention, a documentation inventory manager is provided which assigns a protection key to each piece of documentation that is received. More specifically, when providing information to a receiving company, a client provides their files to a common FTP (File Transfer Protocol) server. As a support team of the receiving company accesses the files and stores some or all of the files to a local storage system, the files are modified to include an imbedded header record. In certain embodiments, the imbedded header record includes information regarding an original file name sent by the client, a key value that is assigned to that version of the downloaded file, permissions such as whether the file can be copied, and the inventory manager location. Each time a version of the file is downloaded to a different location within the receiving company, that file name, location, and new unique key is updated in the documentation inventory manager.

Additionally, in certain embodiments, the external client can view their documentation information in the inventory manager, update which files can be accessed, and mark certain files for deletion. If the client wishes to restrict access of their files to one group or area within the receiving company, the client can remove the access key from the inventory manager. When a file is accessed, the imbedded information in the header record of the file is used to confirm the inventory manager has the key entry that matches the key for this version of the file. If the key is not present in the inventory manager or the key does not match, then the file access is not allowed. The user can also elect to have their file encrypted on the local site when they remove the access key, which allows a further level of security. When a client selects their file to be deleted, the inventory manager receives a confirmation notice when that deletion has been completed. This allows the user to delete their data remotely, and have an audit trail of when the deletion took place.

More specifically, in one embodiment of the present invention relates to a method for managing access to documentation provided by a client to a company. The method includes: assigning a protection key for a documentation file via a documentation inventory manager prior to providing the documentation file to the company, storing the protection key within a header record; associating the protection key stored within the header record with the documentation file to provide an imbedded header record; providing the documentation file and the imbedded header record to the company; and, managing access to the documentation file via the imbedded header record.

In another embodiment, the present invention relates to a system comprising: a processor; a data bus coupled to the processor; and a computer-usable medium embodying computer program code, the computer-usable medium being coupled to the data bus. The computer program code includes instructions executable by the processor and configured for: assigning a protection key for a documentation file via a documentation inventory manager prior to providing the documentation file to the company, storing the protection key within a header record; associating the protection key stored within the header record with the documentation file to provide an imbedded header record; providing the documentation file and the imbedded header record to the company; and, managing access to the documentation file via the imbedded header record.

In another embodiment, the present invention relates to a computer-usable medium embodying computer program code. The computer program code includes computer executable instructions configured for: assigning a protection key for a documentation file via a documentation inventory manager prior to providing the documentation file to the company; storing the protection key within a header record; associating the protection key stored within the header record with the documentation file to provide an imbedded header record; providing the documentation file and the imbedded header record to the company; and, managing access to the documentation file via the imbedded header record.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIG. 3 shows an example of a client document file.

FIG. 4 shows an example of a company document file.

DETAILED DESCRIPTION

Figure 1:
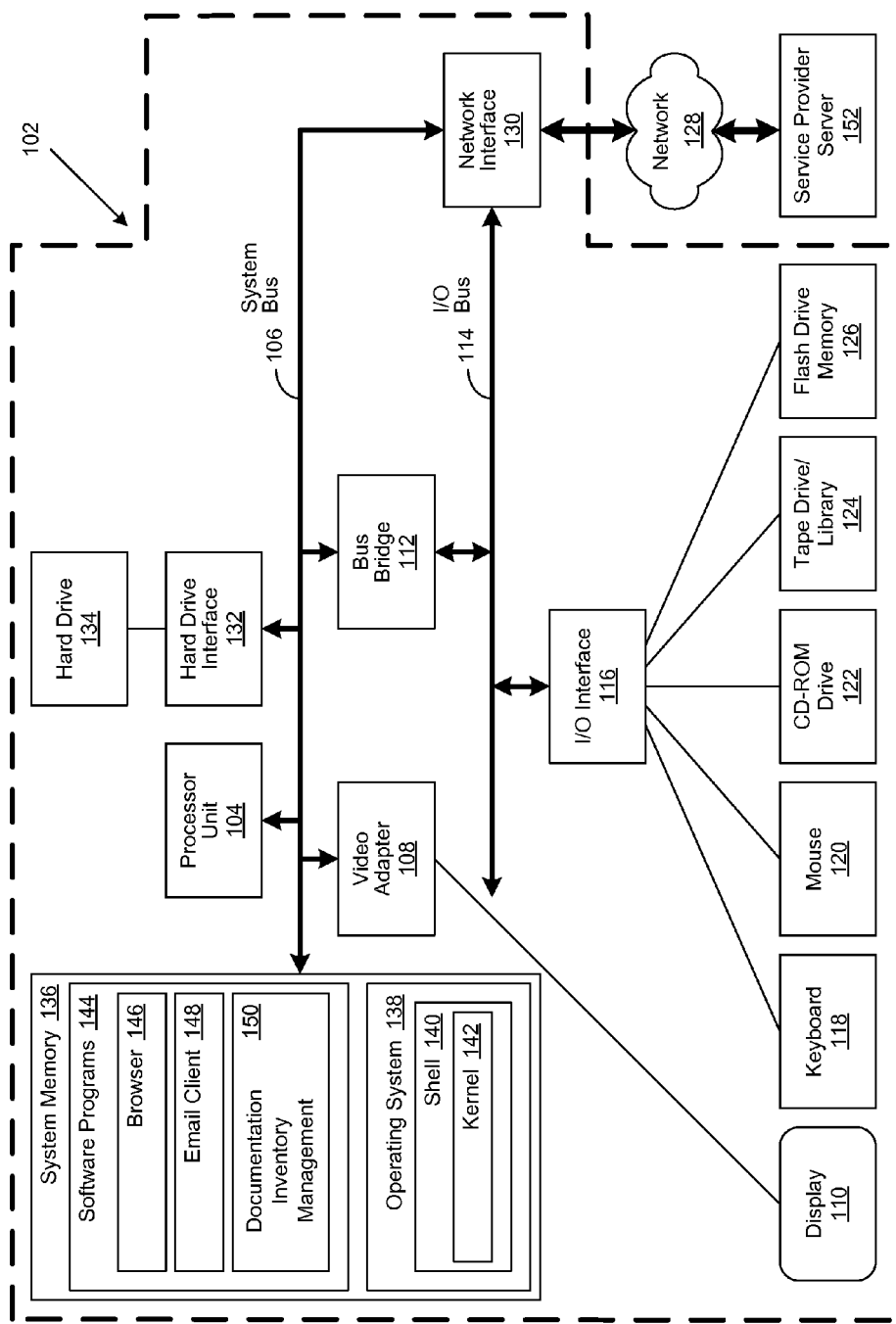
FIG. 1 shows an exemplary computer system in which the present invention may be implemented.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

FIG. 1 is a block diagram of an exemplary client computer 102 in which the present invention may be utilized. Client computer 102 includes a processor unit 104 that is coupled to a system bus 106. A video adapter 108, which controls a display 110, is also coupled to system bus 106. System bus 106 is coupled via a bus bridge 112 to an Input/Output (I/O) bus 114. An I/O interface 116 is coupled to I/O bus 114. The I/O interface 116 affords communication with various I/O devices, including a keyboard 118, a mouse 120, a Compact Disk-Read Only Memory (CD-ROM) drive 122, a tape drive 124 (which may include one or a plurality of tapes to provide a library), and a flash drive memory 126. The format of the ports connected to I/O interface 116 may be any known to those skilled in the art of computer architecture, including but not limited to Universal Serial Bus (USB) ports.

Client computer 102 is able to communicate with a service provider server 152 via a network 128 using a network interface 130, which is coupled to system bus 106. Network 128 may be an external network such as the Internet, or an internal network such as an Ethernet Network or a Virtual Private Network (VPN).

A hard drive interface 132 is also coupled to system bus 106. Hard drive interface 132 interfaces with a hard drive 134. In a preferred embodiment, hard drive 134 populates a system memory 136, which is also coupled to system bus 106. Data that populates system memory 136 includes the client computer's 102 operating system (OS) 138 and software programs 144.

OS 138 includes a shell 140 for providing transparent user access to resources such as software programs 144. Generally, shell 140 is a program that provides an interpreter and an interface between the user and the operating system. More specifically, shell 140 executes commands that are entered into a command line user interface or from a file. Thus, shell 140 (as it is called in UNIX®), also called a command processor in Windows®, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. While shell 140 generally is a text-based, line-oriented user interface, the present invention can also support other user interface modes, such as graphical, voice, gestural, etc.

As depicted, OS 138 also includes kernel 142, which includes lower levels of functionality for OS 138, including essential services required by other parts of OS 138 and software programs 144, including memory management, process and task management, disk management, and mouse and keyboard management.

Software programs 144 may include a browser 146 and email client 148. Browser 146 includes program modules and instructions enabling a World Wide Web (WWW) client (i.e., client computer 102) to send and receive network messages to the Internet using HyperText Transfer Protocol (HTTP) messaging, thus enabling communication with service provider server 152. Software programs 144 also include a documentation inventory manager module 150. The documentation inventory manager module 150 includes code for implementing the processes described in FIGS. 2-4 described hereinbelow. In one embodiment, client computer 102 is able to download the documentation inventory manager module 150 from a service provider server 152.

The hardware elements depicted in client computer 102 are not intended to be exhaustive, but rather are representative to highlight components used by the present invention. For instance, client computer 102 may include alternate memory storage devices such as magnetic cassettes, Digital Versatile Disks (DVDs), Bernoulli cartridges, and the like. These and other variations are intended to be within the spirit and scope of the present invention.

Figure 2:
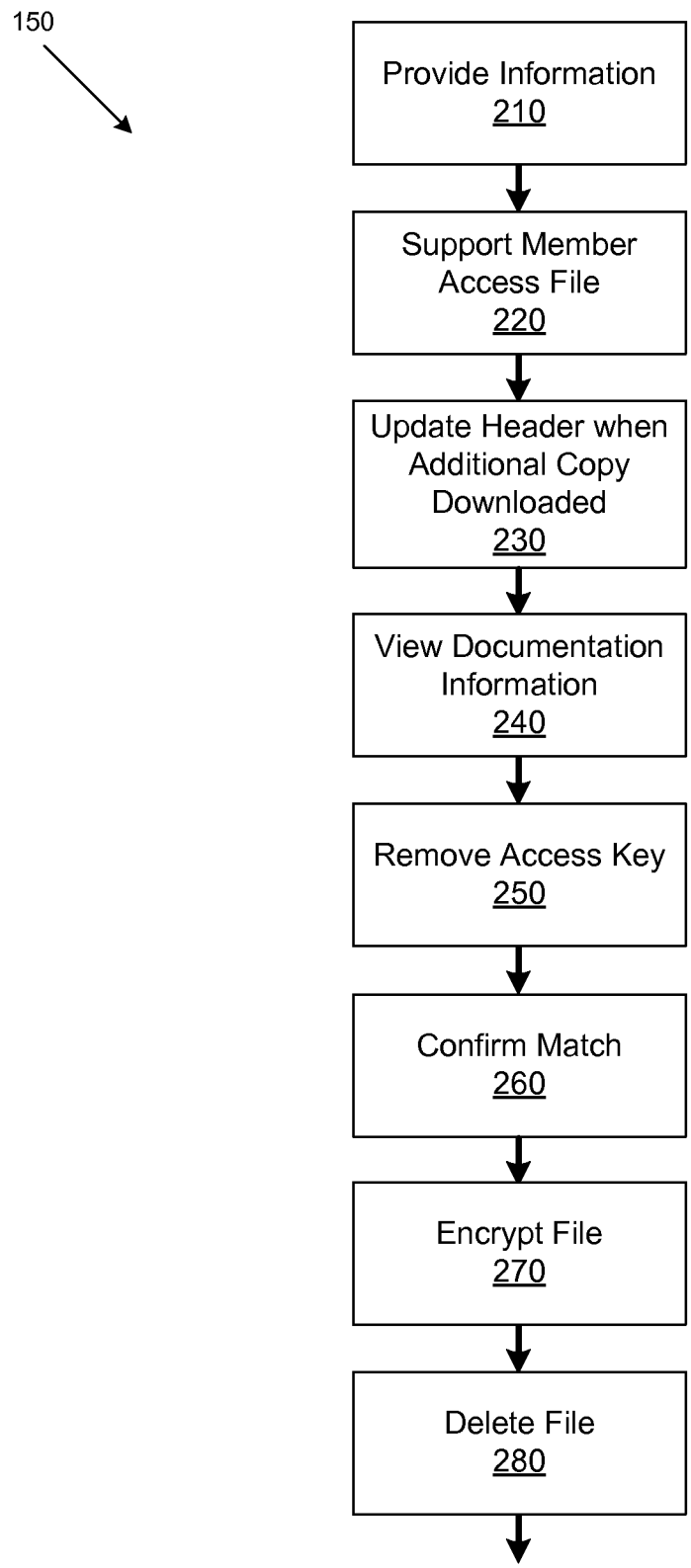
FIG. 2 shows a flow chart of the operation of a documentation inventory manager.

Referring to FIG. 2, a flow chart of the operation of the documentation inventory manager 150 is shown. The documentation inventory manager 150 assigns a protection key to each piece of documentation that is received. More specifically, when providing information to a receiving company at step 210, a client provides their files to a common FTP server. As a support team of the receiving company accesses the files and stores some or all of the files to a local storage system, the files are modified via the documentation inventory manager 150 to include an imbedded header record at step 220. The imbedded header record includes information regarding an original file name sent by the client, a key value that is assigned to that version of the downloaded file, permissions such as whether the file can be copied, and the inventory manager location. At step 230, each time a version of the file is downloaded to a different location within the receiving company, that file name, location, and new unique key is updated in the documentation inventory manager.

The external client can view their documentation information in the inventory manager, update which files can be accessed, and mark certain files for deletion at step 240. If the client wishes to restrict access of their files to one group or area within the receiving company, the client can remove the access key from the inventory manager at step 250. When a file is accessed, the imbedded information in the header record of the file is used to confirm the inventory manager has the key entry that matches the key for this version of the file at step 260. If the key is not present in the inventory manager or the key does not match, then the file access is not allowed. The user can also elect to have their file encrypted on the local site when they remove the access key, which allows a further level of security at step 270. When a client selects their file to be deleted, the inventory manager receives a confirmation notice when that deletion has been completed at step 280. This allows the user to delete their data remotely, and have an audit trail of when the deletion took place.

Referring to FIG. 3, the header record that is created and added to the beginning of any file that is downloaded from the ftp server. This header record 300 includes the following fields:

HEADER_RECORD
Original file name sent by the client
A unique File key that corresponds to the file key in the CUST_DOC_TABLE.
Permissions flag to indicate that this dataset cannot be copied
Location of file Referring to FIG. 4, the documentation inventory manager 150 also includes a client inventory manager file 400 (e.g., a database) that holds information about the file the client has sent. The client inventory manager file 400 holds information about each time an individual at the company downloads the file to their own system. This client inventory manager file includes two tables. More specifically, the client inventory manager file includes a customer documentation file (CUST_DOC_TABLE) as well as a company documentation file (COMP_DOC_TABLE). The CUST_DOC_TABLE holds one entry for each file that has been provided to the company. The company documentation file includes a unique key that is generated, the PMR number the file is associated with, the name of the file that was uploaded, a customer ID number, a customer e-mail address used for notification, and a status flag. The customer can modify this status flag to enable or disable any further downloading of this doc. The COMP_DOC_TABLE contains an entry for any instance that an individual at the company downloads this file. When an individual downloads the file, the client is notified that the file was downloaded. The client can later have this documentation deleted on the company system by requesting the entry be deleted.

More specifically, the customer documentation file provides control information for each file and includes the following entries:

Unique File Key: a unique key generated automatically
PMR Number this helps associate doc with a certain PMR
Server filename: text
Customer ID: this corresponds to a customer's RETAIN client ID
Customer E-mail: text
Download status: values ('enabled', 'disabled')
Table to Hold an Entry for every time the file is downloaded by the receiving company (COMP_DOC_TABLE)
Unique File Key: this relates the entry to the CUST_DOC_TABLE Unique File Key
Company system name: This is the system to which the document was downloaded
Company file name. This is the filename of the document on the company system Although the present invention has been described in detail, it should be understood that various changes, substitutions and alterations can be made hereto without departing from the spirit and scope of the invention as defined by the appended claims.

What is claimed is:

1. A method for managing access to documentation provided by a client to a company, the method comprising:
assigning a protection key for a documentation file via a documentation inventory manager prior to providing the documentation file to the company;
storing the protection key within a header record;
associating the protection key stored within the header record with the documentation file to provide an imbedded header record;
providing the documentation file and the imbedded header record to the company; and,
managing access to the documentation file via the imbedded header record, the managing access executing on a computer system, the managing access comprising determining whether to grant permission to a particular user within the company to access the documentation file; and wherein
the imbedded header record includes information regarding an original file name sent by the client, a key value that is assigned to that version of the documentation file, permissions indicating whether the documentation file can be copied, and the documentation inventory manager location; and,
each time a version of the file is downloaded to a different location within the company, that file name, location, and a new unique key is updated in the documentation inventory manager;
the documentation file and the header file is provided by the client to the company via a common FTP (File Transfer Protocol) server;
the client can view the imbedded header file via the documentation inventory manager, update which files can be accessed by the company, and mark certain files for deletion; and,
the client can restrict access of the documentation file to a particular group within the company via the imbedded header file.

2. A system comprising:
a processor;
a data bus coupled to the processor; and
a computer-usable medium embodying computer program code, the computer-usable medium being coupled to the data bus, the computer program code comprising instructions executable by the processor and configured for:

assigning a protection key for a documentation file via a documentation inventory manager prior to providing the documentation file to the company;

storing the protection key within a header record;

associating the protection key stored within the header record with the documentation file to provide an imbedded header record;

providing the documentation file and the imbedded header record to the company; and, managing access to the documentation file via the imbedded header record, the managing access comprising determining whether to grant permission to a particular user within the company to access the documentation file; and wherein the imbedded header record includes information regarding an original file name sent by the client, a key value that is assigned to that version of the documentation file, permissions indicating whether the documentation file can be copied, and the documentation inventory manager location; and, each time a version of the file is downloaded to a different location within the company, that file name, location, and a new unique key is updated in the documentation inventory manager;

the documentation file and the header file is provided by the client to the company via a common FTP (File Transfer Protocol) server;

the client can view the imbedded header file via the documentation inventory manager, update which files can be accessed by the company, and mark certain files for deletion; and, the client can restrict access of the documentation file to a particular group within the company via the imbedded header file.

3. A non-transitory computer-usable medium embodying computer program code, the computer program code comprising computer executable instructions configured for:

assigning a protection key for a documentation file via a documentation inventory manager prior to providing the documentation file to the company;

storing the protection key within a header record;

associating the protection key stored within the header record with the documentation file to provide an imbedded header record;

providing the documentation file and the imbedded header record to the company; and, managing access to the documentation file via the imbedded header record, the managing access comprising determining whether to grant permission to a particular user within the company to access the documentation file; and wherein the imbedded header record includes information regarding an original file name sent by the client, a key value that is assigned to that version of the documentation file, permissions indicating whether the documentation file can be copied, and the documentation inventory manager location; and, each time a version of the file is downloaded to a different location within the company, that file name, location, and a new unique key is updated in the documentation inventory manager;

the documentation file and the header file is provided by the client to the company via a common FTP (File Transfer Protocol) server;

the client can view the imbedded header file via the documentation inventory manager, update which files can be accessed by the company, and mark certain files for deletion; and, the client can restrict access of the documentation file to a particular group within the company via the imbedded header file.

* * * * *